United States Patent [19]

Schneider

[11] 3,810,130

[45] May 7, 1974

[54] ONE-PORT COMPLEMENTARY MEMORY CELL

[75] Inventor: Herbert Anton Schneider, Boulder, Colo.

[73] Assignee: Bell Telephone Laboratories, Incorporated, Murray Hill, N.J.

[22] Filed: May 2, 1973

[21] Appl. No.: 356,288

[52] U.S. Cl. ............ 340/173 R, 307/231, 307/241, 307/243, 307/244

[51] Int. Cl. ............................................ G11c 11/40

[58] Field of Search ......... 340/173 R; 307/231, 232, 307/241, 243, 244, 269

[56] References Cited

UNITED STATES PATENTS 3,363,115 1/1968 Stephenson et al. ............ 340/173 R

*Primary Examiner*—Terrell W. Fears

*Attorney, Agent, or Firm*—Donnie E. Snedeker

[57] ABSTRACT

A one-port memory cell of the type in which the common collector terminal of a collector-coupled complementary transistor pair is coupled to the input/output port, and the respective emitters of the complementary pair are connected to first and second power sources. When a write signal is applied to the input/output port to transfer the cell state, a switching sequence is established in which an originally conductive transistor of the complementary pair is assured to be nonconductive before the other, originally nonconductive transistor of the pair becomes conductive. Transistor and/or power supply damage during the transition period between cell states is thus avoided.

14 Claims, 3 Drawing Figures

ONE-PORT COMPLEMENTARY MEMORY CELL

BACKGROUND OF THE INVENTION

The present invention relates generally to semiconductor circuits, and more particularly, to one-port memory cells.

Present-day integrated circuit technology is, to a great extent, lead-limited. Thus at best, six independent semiconductor memory cells each having at least one input port and one output port can be accommodated on, for example, a 14-terminal integrated circuit pack (allowing for two power supply leads). One-port memory cells, on the other hand, utilize a single port for both input and output functions. Advantageously then, 12 one-port cells can be accommodated on a 14-terminal pack, a substantial improvement in bit density.

A known type of one-port memory cell, herein referred to as a one-port complementary cell, comprises an input/output complementary transistor pair, which are interconnected, usually, at their collectors. The potential at the common collector terminal of the input/output pair is extended to the input/output port. First and second power sources are coupled to respective emitters of the input/output complementary pair and interconnecting circuitry provides the cell with two stable states, in each of which one transistor of the pair is conductive and the other nonconductive. Thus, a different potential is extended to the input/output node in each cell state. Since these potentials are extended to the input/output node via a saturated (or heavily conducting) transistor in each state, the output impedance of a one-port complementary cell is advantageously the same in both states.

In known one-port complementary cells, both transistors of the input/output complementary pair may become simultaneously conductive for a short period during the transition period between cell states. This effectively places a short circuit across the power supply creating possible power supply ripple and causing large currents to surge through the transistors and power supply. Potential for transistor damage or destruction is thereby created and, unless the power supply is designed to withstand such current surges (usually at additional cost), damage thereto may also result.

My U.S. Pat. No. 3,679,914 issued on July 25, 1972 discloses that in a multi-port complementary cell, these and related problems can be substantially avoided by establishing a switching sequence in which an initially conductive transistor of a collector-coupled complementary pair is assured to be substantially nonconductive before the other transistor of the pair becomes conductive. However, the circuitry disclosed in that patent is not readily adaptable for use in a one-port complementary cell.

SUMMARY OF THE INVENTION

Accordingly, a general object of the invention is to provide an improved one-port complementary cell.

A more specific object of the invention is to provide a one-port complementary cell in which the potential for transistor and power supply damage is minimized and the peak power supply current drain is reduced.

A more specific object of the invention is to provide a one-port complementary cell having a state transfer switching sequence in which the originally conductive transistor of the input/output complementary pair is assured to be substantially nonconductive before the originally nonconductive transistor of the pair becomes conductive.

In a one-port complementary cell in accordance with the invention, the above-mentioned switching sequence is provided by utilizing the current in the conductive transistor of the input/output pair to trigger an associated first switching circuit into operation. The first switching circuit, in turn, switches the conductive transistor nonconductive. A second switching circuit, theretofore operative for maintaining the other transistor of the input/output pair nonconductive, is released in response to operation of the first switching circuit. Only then does the originally nonconductive transistor of the pair become conductive.

The cell is thus transferred from one of its states to the other. When the cell is to be transferred back to its initial state, the current in the now conductive, other transistor is utilized to trigger its associated second switching circuit into operation and thereby switch the conductive transistor nonconductive. Only then is the first switching circuit released, allowing its associated transistor to conduct.

In accordance with a feature of the invention, as shown in an illustrative embodiment thereof, the first and second switching circuits are operated by respective first and second input circuits coupled to the input/output node. As an input circuit operates in response to a write signal of predetermined polarity, it provides a conducting path between its respective switching circuit and the input/output pair collector terminal. The collector current of the associated input/output transistor, presumptively conductive at this time, is thereby directed to the switching circuit to trigger it into operation.

In accordance with an aspect of the invention, the collectors of the input/output pair are coupled to the input/output node via an impedance. Each input circuit has control, common and output terminals, the former two of which are connected to the respective terminals of the impedance, i.e., to the input/output node and input/output pair collector terminal, respectively. The output terminal of each input circuit is coupled to its respective switching circuit. A write signal at the input/output node provides positive or negative current through the impedance, depending on the write signal polarity. The resultant positive or negative drop across the impedance operates one or the other, respectively, of the input circuits.

In accordance with another feature of the invention, as shown in a further illustrative embodiment thereof, current for each input/output transistor, when conductive, is provided from a constant current source which also provides current to the switching circuit associated with that transistor. The switching circuit remains nonoperative, and hence the input/output transistor conductive, as long as the current source provides a predetermined minimum current to the switching circuit. When a write signal is applied to the input/output node, the current in the conductive input/output transistor increases. The current in the latter is thereby utilized to current-starve, and thus trigger, the switching circuit to switch the originally conductive input/output transistor nonconductive. Thereafter, the write signal is diverted to a sensing arrangement which, in response thereto, switches the other, originally nonconductive input/output transistor conductive.

A one-port complementary cell having a low input/output impedance in accordance with a further feature of the invention, is shown in another illustrative embodiment thereof. Current for each input/output transistor, when conductive, is provided via a base-coupled transistor pair, the bases of which are coupled to the collector of a first transistor of the base-coupled pair and the collector of the conductive input/output transistor. When a write signal is applied to the input/output node, the current in the conductive input/output transistor increases, increasing the collector current of the first base-coupled transistor. Since the base-emitter voltages of the base-coupled pair are always equal, the collector current of the other base-coupled transistor increases. The latter transistor becomes substantially conductive, i.e., approaches saturation, thereby operating circuitry which switches the conductive input/output transistor nonconductive and thereafter switches the originally nonconductive input/output transistor conductive.

BRIEF DESCRIPTION OF THE DRAWING

A clear understanding of the invention and of the preceding and other objects and features thereof may be gained from a consideration of the following detailed description and accompanying drawing in which.

DETAILED DESCRIPTION

Figure 1:
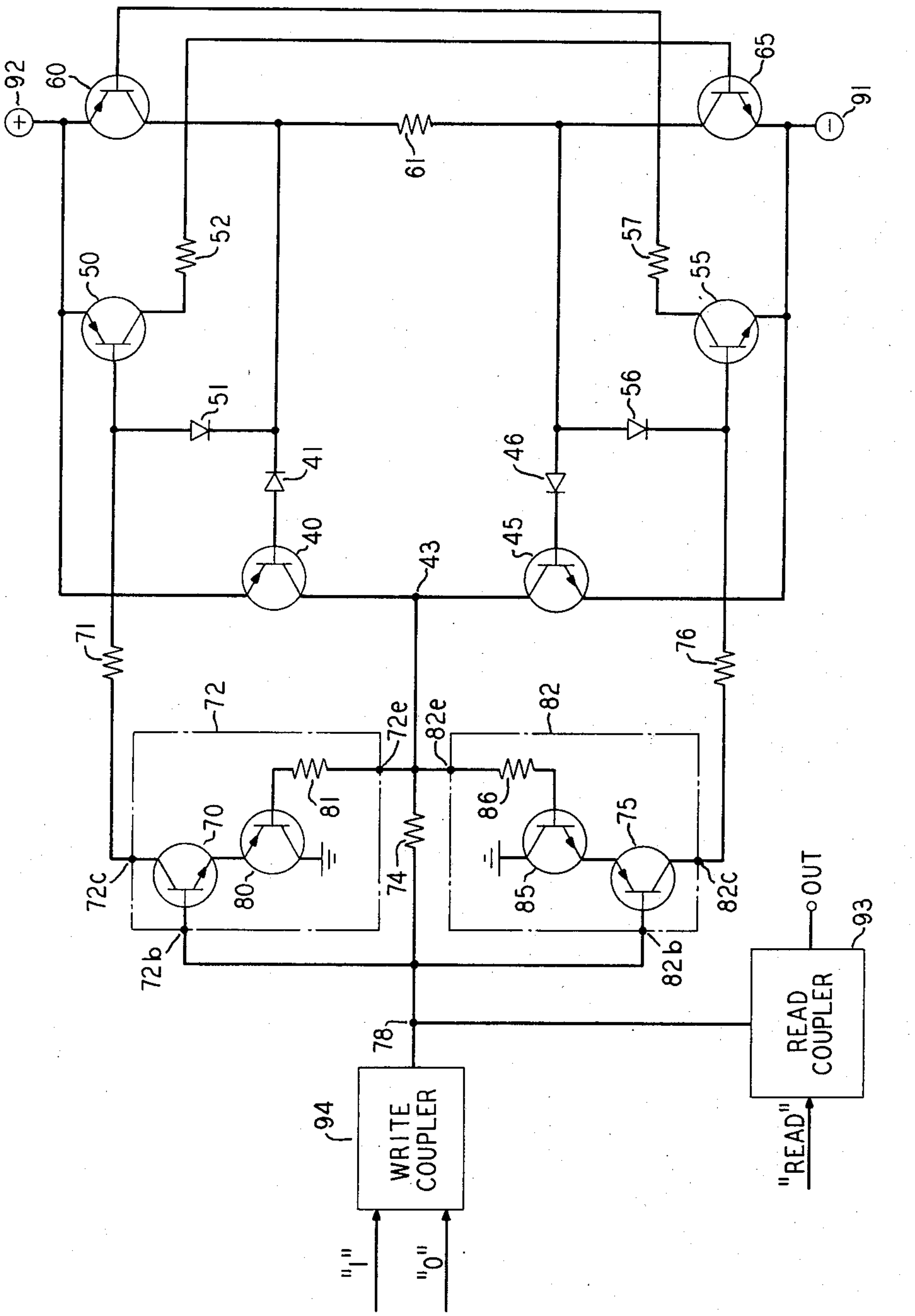
FIG. 1 is an illustrative embodiment of a one-port complementary cell in accordance with the invention.

In the one-port complementary cell depicted in FIG. 1, the input/output complementary transistor pair comprises pnp transistor 40 and npn transistor 45. The collectors of transistors 40 and 45 are coupled to input/output node 78 via collector node 43 and resistor 74. Their emitters are respectively connected to positive and negative voltage sources 92 and 91.

Associated with each of transistors 40 and 45 is a switching transistor pair operative for switching and maintaining it nonconductive. In particular, triggering transistor 55 and clamping transistor 60 comprise a first switching pair associated with transistor 40. When clamping transistor 60 is conductive, the positive potential of source 92 is extended to the base of transistor 40 via transistor 60 and diode 41. Since the emitter of transistor 40 is at this same potential, transistor 40 is nonconductive.

Clamping transistor 60, in turn, is maintained conductive via a bistable, positive feedback relationship with triggering transistor 55. Base current for transistor 60 is provided from source 91 via transistor 55 and resistor 57, while base current for transistor 55 is provided from source 92 via transistor 60, resistor 61 and diode 56.

A second switching transistor pair comprising triggering transistor 50 and clamping transistor 65 is associated with transistor 45. When transistor 65 is conductive, the negative potential of source 91 is extended to the base of transistor 45 via transistor 65 and diode 46. Transistor 45 is thus nonconductive. Transistor 65 is maintained conductive via a bistable, positive feedback relationship with transistor 50. Base current for transistor 65 is provided from source 92 via transistor 50 and resistor 52, while base current for transistor 50 is provided from source 91 via transistor 65, resistor 61 and diode 51.

The collectors of transistors 60 and 65 are respectively coupled to the bases of transistors 50 and 55 via diodes 51 and 56. As a result, conduction of the first switching pair precludes conduction of the second switching pair and vice versa. For example, when first switching pair transistors 55 and 60 are conductive, the positive potential of source 92 is extended through transistor 60 to the cathode of diode 51. Since the potential of source 92 is also extended to the anode of diode 51 via the base-emitter junction of transistor 50, diode 51 is nonconductive and the above-traced base current path for transistor 50 is interrupted. With transistor 50 nonconductive, the above-traced base current path for transistor 65 is also interrupted and that transistor is nonconductive as well.

In a similar manner, conduction of second switching pair transistors 50 and 65 precludes conduction of diode 56 and thus of first switching pair transistors 55 and 60.

When a switching pair is released or nonoperated, i.e., nonconductive, its associated one of transistors 40 and 45 is provided with base current via the clamping transistor of the other switching pair. Thus, for example, when first switching pair transistors 55 and 60 are nonconductive, base current is provided to input/output transistor 40 from source 91 via clamping transistor 65, resistor 61 and diode 41. Conversely, when second switching pair transistors 50 and 65 are nonconductive, base current is provided to input/output transistor 45 from source 92 via clamping transistor 60, resistor 61 and diode 46.

Thus, it will be appreciated that the one-port complementary cell of FIG. 1 has two stable states. In one state, hereinafter referred to as the 0 state, first switching pair transistors 55 and 60, and transistor 45 are all conductive, and second switching pair transistors 50 and 65 and transistor 40 are all nonconductive. In the 0 state, the negative potential of source 91 is extended to input/output node 78 via transistor 45, collector node 43 and resistor 74.

In the other, 1, state the opposite conductivities obtain, the positive potential of source 92 being extended to input/output node 78 via transistor 40, collector node 43 and resistor 74.

The state of the FIG. 1 cell is sensed in conventional manner by read coupler 93 which, in response to a "read" command provides at its output terminal an indication of the potential at node 78 and hence the state of the cell. Coupler 93 may comprise any of varied arrangements known to those skilled in the art and may advantageously include, for example, field effect transistor circuitry to provide a high impedance to node 78.

The one-port complementary cell of FIG. 1 is established in either its 0 or 1 state by application of an appropriate command to write coupler 94. When, for example, a 1 command is applied to write coupler 94, the latter provides a positive potential to input/output node 78. Circuitry in accordance with the invention utilizes the current in transistor 45, conductive in the 0 state, to trigger the second switching pair into operation, and thus switch transistor 45 nonconductive.

Specifically, in the illustrative embodiment, this circuitry includes resistor 74, three-terminal input circuit 72, and resistor 71. Circuit 72 includes control terminal 72*b*, common terminal 72*e* and output terminal 72*c*. Terminals 72*b* and 72*e* of input circuit 72 are connected to input/output node 78 and collector node 43, respectively. Resistor 71 couples terminal 72*c* to the base of transistor 50.

The above-mentioned positive potential now provided at input/output node 78 causes current to flow from write coupler 94 through node 78, resistor 74, node 43 and transistor 45 (conductive in the 0 state) to source 91. The resultant drop across resistor 74 renders terminal 72*b* positive with respect to terminal 72e and operates input circuit 72. Operation of circuit 72 provides a conducting path from terminal 72*c* to terminal 72*e*. The current in transistor 45 is thus utilized in accordance with the invention to trigger the second switching pair into operation by providing base current for transistor 50 via node 43, terminals 72*e* and 72*c* and resistor 71. As transistors 50 and 65 conduct, transistors 45 and 55 are switched nonconductive substantially concurrently. Since transistors 50 and 65 maintain each other conductive, the 1 command may be terminated at this point. Nonconductive transistor 55 causes nonconduction of transistor 60. The first switching pair is thus released and transistor 40 becomes conductive, base current being provided thereto from transistor 65 as described above.

The cell is thus transferred from its 0 to its 1 state. Since transistors 45 and 55 are switched nonconductive substantially concurrently by transistor 65, nonconduction of transistor 45 before conduction of transistor 40 is assured, and the above-discussed problems attendant to simultaneous conduction in transistors 40 and 45 are avoided.

When the cell of FIG. 1 is to be transferred back to the 0 state, a 0 command is provided to write coupler 94. A negative potential applied to input/output node 78 from coupler 94 causes current to flow from source 92 via transistor 40, node 43, resistor 74 and input/output node 78 into coupler 94. Circuitry including resistor 74, three-terminal input circuit 82 and resistor 76, utilizes the current in transistor 40 in accordance with the invention to trigger the first switching pair into operation and thus switch transistor 40 nonconductive.

In particular, the current through resistor 74 renders terminal 82*e* of input circuit 82 positive with respect to terminal 82*b* thereof and operates input circuit 82. Operation of circuit 82 provides a conducting path from terminal 82*e* to terminal 82*c*. The current in transistor 40 is thus utilized in accordance with the invention to trigger the first switching pair into operation by providing base current for transistor 55 via node 43, terminals 82*e* and 82*c* and resistor 76. A switching sequence similar to that described above thus assures that transistor 40 is switched nonconductive before transistor 45 becomes conductive, that sequence being, transistor 55 conductive, transistor 60 conductive, transistors 40 and 50 nonconductive, transistor 65 nonconductive, transistor 45 conductive.

It will be appreciated from the foregoing description that input circuit 72 may comprise a single npn transistor, the base, emitter and collector thereof being connected to terminals 72*b*, 72*e* and 72*c*, respectively. Similarly, input circuit 82 may comprise a pnp transistor. However, it has been found that when circuits 72 and 82 each comprise only a single transistor, the cell of FIG. 1 may behave somewhat unpredictably in certain situations. Consider, for example, write coupler 94 to be in a nonoperated state. Input/output node 78 is then coupled to a potential at or near ground via the internal impedance of write coupler 94. Since terminal 72*e* is substantially negative when, for example, the bell is in the 0 state, terminal 72*b* is positive with respect to terminal 72*e*. If input circuit 72 is a single transistor connected as suggested above, that transistor may become somewhat forward biased (depending, for example, on the internal impedance of write coupler 94) thereby providing some base current to transistor 50 and rendering a number of the other cell transistors partially, but not fully, conductive. It has been observed that under these conditions, a positive feedback loop may be established with sufficient gain to cause spurious high-frequency oscillations within the cell.

Advantageously, oscillation and other problems in the cell are avoided by the configuration for input circuits 72 and 82 shown in FIG. 1. Circuit 72, for example, illustratively comprises two npn transistors 70 and 80, and a resistor 81. The base and collector of transistor 70 are coupled to terminals 72*b* and 72*c*, respectively. The emitters of transistors 70 and 80 are interconnected. The collector of transistor 80 is coupled to ground, while the base thereof is coupled to terminal 72*e* via resistor 81.

When the cell of FIG. 1 is in the 0 state, with the collector-base diode of transistor 80 is forward biased by current flowing therethrough from ground to source 91 via resistor 81, node 43 and transistor 45. Accordingly, the base potential of transistor 80 is approximately minus one-half volt with respect to ground, and the emitter-base diodes of transistors 70 and 80 are both reverse-biased. Thus, no conducting path can be established from terminal 72*c* to terminal 72*e* until sufficient positive potential has been applied to input/output node 78 to forward bias both transistors 70 and 80. Thus, even if input/output node 78 is coupled to a potential at or near ground as discussed above, input circuit 72 is fully nonoperated, and the abovenoted oscillation problem is avoided.

Circuit 82 comprising pnp transistors 75 and 85 and resistor 86, operates similarly. It remains completely nonoperative and no conducting path is established from terminal 82*e* to terminal 82*c* until sufficient negative potential has been applied to input/output node 78 to forward bias both transistors 75 and 85.

The one-port complementary cell of FIG. 1 can be modified, if desired, by open circuiting diodes 51 and 56, short-circuiting diodes 41 and 46 and connecting the emitters of transistors 40 and 45 to the bases of transistors 50 and 55, respectively, rather than to sources 92 and 91.

Figure 2:
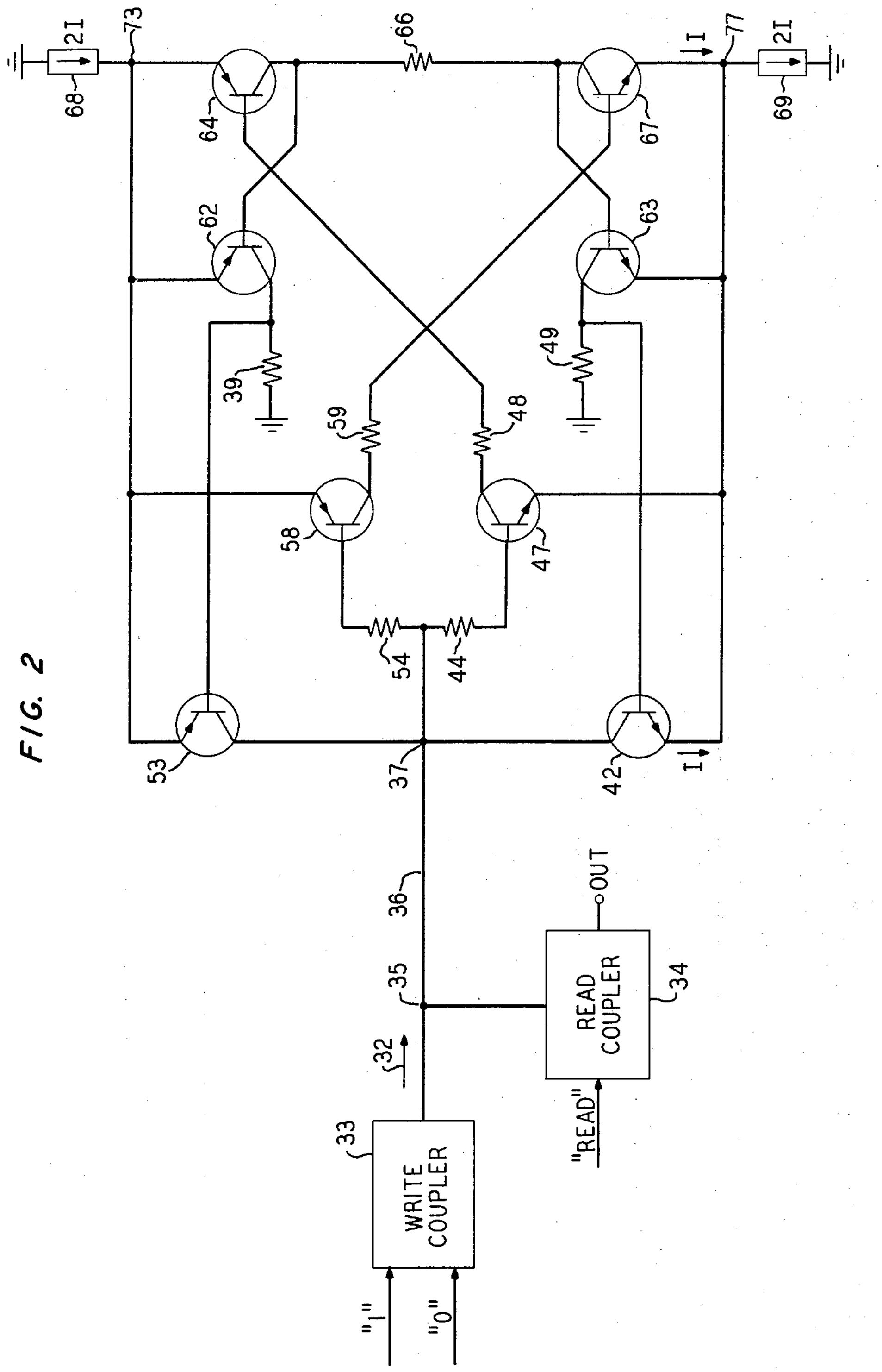
FIG. 2 is a further illustrative embodiment of a one-port complementary cell in accordance with the invention.

In the further illustrative embodiment of the invention depicted in FIG. 2, the input/output complementary transistor pair comprises pnp transistor 53 and npn transistor 42, the collectors of which are coupled to input/output node 35 via collector node 37. The emitters of transistors 53 and 42 are respectively connected to current sources 68 and 69 via nodes 73 and 77. Source 68 supplies a constant current of illustrative magnitude 2I to node 73, while source 69 draws a constant current of magnitude 2I away from node 77.

The bases of input/output transistors 53 and 42 are connected to the collectors of clamping transistors 62 and 63, respectively. Thus, conduction in clamping transistors 62 and 63 causes nonconduction in input/output transistors 53 and 42, respectively. Conversely, nonconduction in clamping transistors 62 and 63 allows conduction in input/output transistors 53 and 42, respectively, base current for the latter two transistors then being provided from ground via resistors 39 and 49, respectively.

The one-port complementary cell in FIG. 2 further comprises control transistors 64 and 67 each of which is operative for maintaining one of clamping transistors 62 and 63 conductive and the other nonconductive. The collectors of control transistors 64 and 67 are connected to the bases of transistors 62 and 63, respectively, while the collectors of transistors 64 and 67 are interconnected via resistor 66. Thus, when transistor 64 is conductive, transistor 62 is clamped nonconductive and base current is supplied to transistor 63 from the collector of transistor 64 via resistor 66. When, on the other hand, transistor 67 is conductive, transistors 62 and 63 are conductive and nonconductive, respectively. Thus, when transistor 64 is conductive, input/output transistors 42 and 53 are nonconductive and conductive, respectively. When transistor 67 is conductive, transistors 42 and 53 have the opposite conductivities.

Sensing transistors 47 and 58 sense the present conductivities of transistors 42 and 53 and operate that one of control transistors 64 and 67 which will maintain transistors 42 and 53 in those conductivities. The cell is thus provided with two stable states. In particular, the bases of sensing transistors 47 and 58 are coupled to node 37 via resistors 44 and 54, respectively. The collector of transistor 47 is coupled to the base of transistor 64 via resistor 48 and the collector of transistor 58 is coupled to the base of transistor 67 via resistor 59.

When, for example, transistors 42 and 53 are conductive and nonconductive, respectively, in the 0 state, base current for transistor 58 is provided via transistor 42 and resistor 54. Conduction of transistor 58 provides conduction of transistor 67, which as discussed above, assures continued conduction and nonconduction of transistors 42 and 53, respectively. No base current is provided to sensing transistor 47 which, along with transistor 64, is therefore nonconductive.

When, on the other hand, transistor 53 is conductive and transistor 42 nonconductive in the 1 state, transistor 47 rather than transistor 58 is conductive, base current being provided to the former via transistor 53 and resistor 44. Accordingly, transistor 64 is conductive, assuring as discussed above, that transistors 53 and 42 are maintained in their 1 state conductivities.

The cell of FIG. 2 is illustratively depicted in the 0 state. Transistors 47 and 63 are nonconductive, so that the constant current 2I drawn away from node 77 by source 69 is divided between transistors 42 and 67. Illustratively, transistors 42 and 67 carry equal current, I, but this is of course a matter of engineering design.

The state of the FIG. 2 cell is sensed by read coupler 34 coupled to input/output node 35. Read coupler 34 may be substantially identical to read coupler 93 of FIG. 1.

The state of the FIG. 2 cell is controlled by write coupler 33. When a 1 command is provided to write coupler 33, the latter directs a positive current to input/output node 35 in the direction indicated by arrow 32. In response to a 0 command, write coupler 33 draws negative current away from input/output node 35 in a direction opposite to arrow 32.

Transistors 63 and 67 comprise a first switching circuit operative for switching transistor 42 nonconductive. When a 1 command is provided to write coupler 33, circuitry in accordance with the invention, including source 69, utilizes the current in transistor 42 to operate the first switching circuit which in turn switches that same transistor nonconductive. In particular, the positive input current provided to input/output node 35 from write coupler 33 flows into transistor 42 and increases the emitter current thereof to a value approaching 2I. Since the current leaving node 77 is fixed at 2I, transistor 67 is current starved and is switched nonconductive. The first switching circuit is thus triggered into operation. The current flowing through resistor 66 from the base of transistor 62 now flows into the base of transistor 63 instead of the collector of transistor 67, and with transistor 63 conductive, transistor 42 is switched nonconductive. Hence transistor 58 is switched nonconductive. Nonconduction in transistor 58 assures that transistor 67 will remain nonconductive.

Transistors 62 and 64 comprise a second switching circuit heretofore operating, (transistor 62 conductive and transistor 64 nonconductive) to maintain transistor 53 nonconductive. However, as the input current from write coupler 33, now flowing into the base of transistor 47 via resistor 44, switches transistor 47 conductive, the second switching circuit is released. Transistors 64 and 62 become conductive and nonconductive, respectively, and transistor 53 thus becomes conductive. Although transistor 62 is switched nonconductive, base current is now provided for transistor 63 from transistor 64 via resistor 66. Base current for transistor 47 is provided from transistor 53 and the 1 command can be terminated.

The cell is thus transferred from its 0 to its 1 state with transistor 42 being switched nonconductive before transistor 53 becomes conductive. The cell is returned to the 0 state when a 0 command, provided to write coupler 33, draws current away from input/output node 35. This increases the emitter current in transistor 53, current starving transistor 64 which is switched nonconductive. In a manner similar to that described above, this initiates the switching sequence, transistor 62 conductive, transistor 53 nonconductive, transistors 47 and 58 nonconductive and conductive, respectively, transistor 67 conductive, transistor 63 nonconductive and transistor 42 conductive.

It will be appreciated that in the one-port complementary cell of FIG. 2, transistor damage, for example, is avoided not only by the switching sequence whereby each of transistors 42 and 53 is assured to be nonconductive before the other becomes conductive, but also by the fact that the maximum current through these transistors is fixed at 2I, which current can be set at a safe level for the transistors utilized in the cell.

The impedance presented to input/output node 78 in the embodiment of FIG. 1 is substantially determined by the magnitude of resistor 74, which may be as large as several tens of kilohms. A relatively large impedance is also presented to input/output node 35 in the embodiment of FIG. 2, since constant current sources 68 and 69 are inherently high-impedance devices. While an input/output impedance of relatively large magnitude may not be objectionable in certain one-port cells, a low input/output impedance is often desirable.

Figure 3:
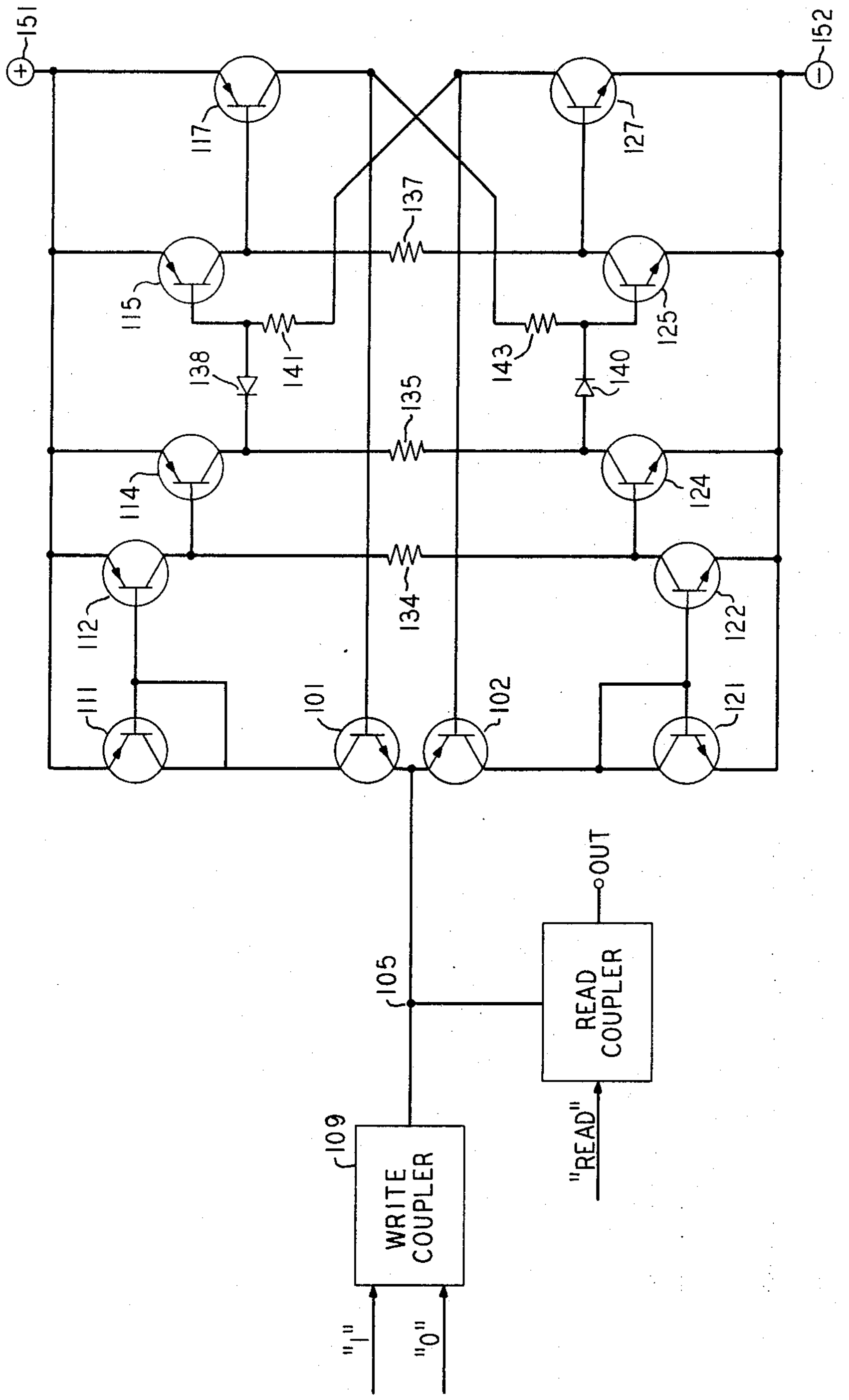
FIG. 3 is a further illustrative embodiment of a one-port complementary cell in accordance with the invention which has a low input/output impedance.

A one-port complementary cell having low input/output impedance is shown in FIG. 3. The input/output complementary pair comprises transistors 101 and 102, the emitters of which are connected in common to input/output node 105. Collector current for transistor 101, when conductive, flows from positive source 151 via base-coupled transistor pair 111 and 112. Collector current for transistor 102, when conductive, flows to source 152 via base-coupled transistor pair 121 and 122.

Whenever the cell is quiescent, transistors 114 and 124 are each conductive, one providing a base current path for the other via resistor 134.

Assume now that the cell of FIG. 3 is in its 0 state. Transistors 115 and 127 are conductive, base current for transistor 115 being provided from the collector of transistor 127 via resistor 141 while base current for transistor 127 is provided from the collector of transistor 115 via resistor 137. Since transistor 115 is conductive, transistor 117 is clamped nonconductive. The base current path for transistor 125 via transistor 117 and resistor 143 is therefore interrupted and transistor 125 is nonconductive.

Thus in the 0 state, transistor 102 is conductive, base current therefor being provided via the collector of conductive transistor 127. Since transistor 117 is nonconductive, the base current path therethrough for transistor 101 is interrupted and transistor 101 is assured to be nonconductive.

A 1 command provided to write coupler 109 directs input current to input/output node 105. This input current flows into the emitter of transistor 102, increasing the collector current thereof. The bases of transistors 121 and 122 draw relatively little current so that substantially all of the increased collector current of transistor 102 flows into the collector of transistor 121. Since the base-emitter drops of transistors 121 and 122 are equal, then collector currents must be substantially equal (assuming similar transistor characteristics). Therefore, a correspondingly increased collector current must be drawn by transistor 122 from resistor 134. Transistor 122 becomes substantially conductive, i.e., approaches saturation, and switches transistor 124 nonconductive. Current through resistor 135, heretofore flowing into the collector of transistor 124, is now directed to the base of transistor 125 via diode 140. Transistor 125 becomes conductive and switches transistor 127 nonconductive. The base current paths for transistors 102 and 115 are thus interrupted and those transistors are switched nonconductive.

Base current for transistor 117 is now provided from the collector of transistor 125 via resistor 137 and base current for transistor 125 is provided from the collector of transistor 117 via resistor 143. Conductive transistor 117 provides base current for transistor 101, switching the latter conductive. Nonconduction of transistor 102 results in nonconduction of transistors 121 and 122. Accordingly, transistor 124 returns to conduction.

The cell is thus switched from its 0 to its 1 state with transistor 101 becoming conductive only after transistor 102 is switched nonconductive. Since the cell is symmetric, a similar switching sequence, which will be obvious to those skilled in the art, returns the cell to its 0 state when a 0 command provided to write coupler 109 draws current away from input/output node 105.

The one-port complementary cell of FIG. 3 provides a very low impedance to input/output node 105 in the 0 state because transistor 102 acts as an emitter follower, reducing the already low saturation resistance of transistor 127 by approximately a factor of beta. Similarly, a low input/output impedance is provided in the 1 state, by the emitter follower action of transistor 101.

The cell of FIG. 3 can be modified, if desired, providing a somewhat larger input/output impedance by connecting the collectors of transistors 101 and 102 in common to node 105, their emitters to the collectors of transistors 121 and 111, respectively, and their bases to the collectors of transistors 125 and 115, respectively, rather than to the collectors of transistors 117 and 127; and by inserting a diode poled in the direction of base current flow, in the base leg of each of transistors 117 and 127.

The above-described embodiments merely illustrate the invention and it will be appreciated by those skilled in the art that many and varied arrangements may be devised in accordance with the principles of the invention without departing from the spirit and scope thereof. It will be appreciated, for example, that although bipolar transistors are illustratively shown herein, other functionally equivalent devices, such as field effect transistors, may also be utilized in one-port complementary cells in accordance with the invention.

I claim:

1. A memory cell comprising, an input/output node, a first input/output transistor of a first conductivity type, a second input/output transistor of a second conductivity type, means for coupling an electrode of each of said first and second transistors in common to said node, first switching means operative for switching said first transistor from a conductive to a nonconductive state, and second switching means operative for maintaining said second transistor nonconductive, the improvement, comprising means for releasing said second switching means only after said first transistor is switched to a nonconductive state, said releasing means including circuit means operative in response to a write signal applied at said node for utilizing current in said first transistor when said first transistor is conductive to operate said first switching means.

2. A memory cell in accordance with claim 1 wherein said coupling means comprises means for coupling the collectors of said first and second transistors to said node and wherein said first switching means includes a first clamping transistor connected across the base-emitter junction of said first transistor, triggering means including a first triggering transistor for operating said first clamping transistor in response to said first transistor current, and means responsive to operation of said first clamping transistor for maintaining said triggering means operated.

3. A memory cell in accordance with claim 1 wherein said first switching means includes means operative when said first transistor current is applied to said first switching means for switching said first transistor nonconductive, said circuit means applying said first transistor current to said first switching means in response to said write signal.

4. A memory cell in accordance with claim 3 wherein said coupling means comprises an impedance for coupling the collectors of said first and second transistors in common to said node and wherein said circuit means includes a control terminal, an output terminal and a common terminal, said control terminal being coupled to said node, said output and common terminals being coupled to said first switching means and to said first and second transistor collectors, respectively, said circuit means providing a current conducting path between said output and common terminals in response to a predetermined potential difference between said control and common terminals.

5. A memory cell in accordance with claim 1 wherein said circuit means comprises means for operating said first switching means in response to an increase in said first transistor current, said write signal increasing said first transistor current.

6. A memory cell in accordance with claim 5 wherein said first switching means operates in response to a decrease in current therethrough, and wherein said means for operating said first switching means includes constant current means for providing a constant current in common to said first transistor and said first switching means.

7. A memory cell in accordance with claim 6 wherein said first switching means comprises a control transistor, a clamping transistor, means for connecting the emitters of said control and clamping transistors to said constant current means, and means for connecting the collectors of said control transistor and clamping transistor to the bases of said clamping transistor and said first input/output transistor, respectively.

8. A memory cell in accordance with claim 7 wherein said second switching means releases in response to a predetermined current applied thereto, and wherein said releasing means includes sensing means operative in response to said write signal when said first and second transistors are concurrently nonconductive for providing said predetermined current to said second switching means.

9. A memory cell in accordance with claim 5 wherein said means for operating said first switching means comprises first and second base-coupled transistors, means for connecting the bases of said base-coupled transistors to the collector of said first input/output transistor and the collector of said first base-coupled transistor, and means for operating said first switching means in response to substantial conduction in said second base-coupled transistor.

10. A memory cell comprising, a first transistor of the npn type, a second transistor of the pnp type, an input/output node, means for coupling the collectors of said first and second transistors in common to said node, first clamping means operative for switching and maintaining said first transistor nonconductive, second clamping means operative for switching and maintaining said second transistor nonconductive, first and second trigger means for operating said first and second clamping means, respectively, means normally operative for inhibiting operation of said first and second trigger means in response to operation of said second and first clamping means, respectively, and input means for operating said first and second trigger means in response to first and second write signals applied to said node, respectively.

11. A memory cell in accordance with claim 10 wherein said coupling means comprises an impedance and wherein said input means comprises first and second input circuits respectively operative in response to first and second polarity voltage drops across said impedance for coupling said collectors to said first and second trigger means, respectively.

12. A memory cell in accordance with claim 11 wherein said first and second clamping means respectively comprise first and second clamping transistors of the npn and pnp types, respectively, and wherein said first and second trigger means respectively comprise first and second triggering transistors of the pnp and npn types, respectively, said memory cell further comprising means for interconnecting said first triggering and clamping transistors to provide a bistable relationship therebetween and means for interconnecting said second triggering and clamping transistors to provide a bistable relationship therebetween, said inhibiting means including means for coupling the collectors of said first and second clamping transistors to the bases of said second and first triggering transistors, respectively.

13. A memory cell in accordance with claim 11 wherein each of said first and second trigger means comprises a triggering transistor and wherein each of said first and second input circuits includes means for connecting said first and second transistor collectors to the base of a different one of said first and second triggering transistors.

14. A memory cell in accordance with claim 13 wherein said means for connecting includes third and fourth transistors, means for coupling the base and collector of said third transistor to said input/output node and said one triggering transistor, respectively, means for interconnecting the emitters of said third and fourth transistors, means for coupling the collector of said fourth transistor to a fixed potential, and means for coupling the base of said fourth transistor to said first and second transistor collectors.

* * * * *